Patented June 26, 1951

2,557,923

UNITED STATES PATENT OFFICE 2,557,923

RECOVERY OF OLEFIN HYDROCARBONS

Gardner C. Ray and E. O. Box, Jr., Bartlesville, Okla., assignors to Phillips Petroleum Company, a corporation of Delaware No Drawing. Application November 7, 1947, Serial No. 784,768

11 Claims. (Cl. 260—677)

This invention relates to the separation of olefinic hydrocarbons from hydrocarbon mixtures containing olefinic hydrocarbons and saturated hydrocarbons. In one of its more specific aspects it relates to a process for recovering ethylene from gaseous mixtures containing ethylene and saturated hydrocarbons. In a still more specific aspect it relates to an improved reagent for the separation of olefins from saturated hydrocarbons and recovery of the olefins in a high degree of purity.

The process of this invention comprises contacting a hydrocarbon mixture containing olefinic and paraffinic hydrocarbons with a solution of a cuprous salt dissolved in 1-methoxy-2-amino-ethane, or in an aqueous solution of 1-methoxy-2-amino-ethane. This compound is hereinafter termed methoxyethylamine, and the aqueous solution may be referred to merely as aqueous methoxyethylamine. Contacting is conducted under such conditions that substantial amounts of olefinic hydrocarbons are dissolved. The cuprous solution containing the dissolved olefinic hydrocarbons is separated from the residual hydrocarbon or hydrocarbons and passed to a stripping or desorption zone. The olefin or olefins are recovered from the solution in a relatively pure form by applying heat and/or reducing the pressure in this zone.

It has long been known that olefins react with cuprous salts in aqueous or nonaqueous media to yield easily decomposable addition products, while paraffin hydrocarbons do not. This reactivity of olefins with cuprous salts has been applied to the separation of olefins from paraffins. Because of the very low solubility of most cuprous salts in water, various aqueous and non-aqueous solvents have been utilized to dissolve the cuprous salts. Known processes using aqueous media have employed hydrochloric acid or ammonia to bring appreciable amounts of the cuprous salt into solution. The use of these solvents has proven unsatisfactory for several reasons. For example, if hydrochloric acid is used, much corrosion of equipment is suffered. If ammonia is employed, special procedures and equipment are required to prevent loss of ammonia during absorption and evolution of the olefins.

The use of aqueous or nonaqueous solutions of cuprous salts dissolved in organic nitrogen bases or phenols has been proposed as a means of overcoming the aforementioned difficulties attendant to the use of aqueous cuprous solutions for olefin recovery (Evans, U. S. Patent 2,376,239; Robey, U. S. Patent 2,245,719; Imperial Chemicals Ltd., French Patent 797,470; Joshua and Stanley, U. S. Patent 2,005,500).

The principal object of the present invention is to provide an improved process and reagent for the separation and/or recovery of olefins. Another object is to provide an improved process and reagent for recovering mono-olefins from saturated hydrocarbons. Another object is to provide an improved process and reagent for recovering ethylene from gaseous mixtures containing the same in admixture with saturated hydrocarbons such as methane, ethane and propane, with or without hydrogen. Another object is to provide an improved process and reagent for recovering diolefins, especially aliphatic conjugated diolefins, such as butadiene, isoprene and piperylene, from admixture with saturated hydrocarbons. Numerous other objects will hereinafter appear.

In its broadest aspect our invention is a process for separating olefins from admixture with saturated hydrocarbons which comprises contacting the hydrocarbon mixture containing the olefin and the saturated hydrocarbon with a solution of a cuprous salt in methoxyethylamine or in aqueous methoxyethylamine.

Ordinarily the process of our invention is carried out in such manner as not only to accomplish separation of the olefin from the saturated hydrocarbon initially in admixture therewith but also to effect recovery of the olefin in concentrated form. The recovery of the olefin is usually effected by subjecting the olefin-containing solution resulting from the contacting step and after separation of said solution from the undissolved hydrocarbon, which separation is ordinarily carried out by simply withdrawing the olefin-containing solution from the scrubbing zone, to at least one of pressure reduction or heating to cause liberation of the dissolved olefin. The olefin is probably held in the form of a soluble olefin-cuprous salt complex or addition compound which is capable of being dissociated by reducing the pressure or applying heat or both.

Generally speaking, the conditions under which the contacting or absorption step is conducted are such that the olefin-containing hydrocarbon feed is in the gaseous state. As will be obvious, this may be insured by the use of a temperature above the critical temperature or by the use of a pressure below the critical pressure where use of a pressure equal to or greater than the critical pressure would result in condensation of the hydrocarbon at the temperature employed. In some cases it may be desirable to expedite maintenance of the hydrocarbon in the gaseous phase by admixture with an inert non-condensible gas if the feed hydrocarbon mixture contains an insufficient amount of such a gas. Examples of such a gas are methane, ethane, hydrogen, nitrogen. The gas should be oxygen-free and inert toward either the hydrocarbon mixture or the reagent and should have substantially no solubility in the reagent. The amount of such gas is preferably sufficiently great to lower the condensation temperature or dew-point of the hydrocarbon mixture to a value substantially below the temperature employed in the absorption step.

We have discovered that aqueous methoxyethylamine dissolves unexpectedly large quantities of cuprous salts (in excess of 35 per cent). We have further found that the resulting solutions have a high capacity for dissolving olefin hydrocarbons and an inertness toward paraffins. This capacity is a distinct advantage, since smaller-scale equipment may be used to accomplish a given olefin-paraffin separation. It is especially advantageous when the concentration of the olefin to be recovered is comparatively low. The mixture to which the process is applied may consist of a single paraffin and one or more olefin hydrocarbons or of a single olefin and one or more paraffin hydrocarbons. Thus, ethylene may be separated from methane, ethane, propane and/or butane, and ethylene, propylene and butylenes, butadiene, etc., may be separated from methane, ethane, propane, and/or butanes. The terms "olefinic" and "olefin" are intended to embrace open-chain diolefins (especially the aliphatic conjugated diolefins) as well as open-chain olefins (i. e. aliphatic mono-olefins). In some cases both a mono-olefin and a diolefin may be present and may be recovered together by the process of the present invention. The term "saturated hydrocarbon," as used herein, includes in its broadest meaning both the acyclic and the alicyclic paraffin hydrocarbons, but generally has reference to the acyclic paraffins since the alicyclic paraffins are seldom found in admixture with the acyclic diolefins and mono-olefins. This process may be applied to the separation of the components of normally liquid as well as those of normally gaseous olefin-paraffin mixtures. Thus, pentenes may be separated from pentanes, hexenes from hexanes, etc.

As stated above, the process of our invention is preferably executed with the hydrocarbon mixture in the gaseous phase. Any suitable method of contacting the gases with the liquid solution of cuprous salt may be employed. The preferred procedure is to contact countercurrently the hydrocarbon mixture in the gas phase with the liquid in a tower provided with bubble plates or other contact elements such as sprays, packing, baffles, etc.

If desired, means may be provided for mechanical agitation of the scrubbing liquid (i. e., the reagent solution) and the olefin-containing gas in order to greatly increase the rate of dissolving olefin. The rate of dissolving olefin may be slow in the absence of such mechanical agitation. Instead of positively agitating, as by means of a rotated stirrer, we may use any suitable means for attaining fine subdivision of the gas and scrubbing solution and the desired high degree of intimacy of contact therebetween. Thus, the scrubbing tower may be provided with orifices, porous plates, perforated trays, baffles, the usual bubble trays, etc. In some cases a combination of stirring and baffling may be employed. Rapidly rotating turbines which trap the gas and divide it into small bubbles more readily absorbed by the liquid may be used.

Generally the solution of cuprous salt in methoxyethylamine or an aqueous solution thereof is injected continuously into the top of the scrubbing tower and allowed to descend therein in intimate countercurrent contact with the ascending gas, the hydrocarbon feed being injected continuously into the bottom of the tower. The gas withdrawn from the top is essentially or completely free from olefin. The olefin-containing scrubbing liquid is withdrawn continuously from the bottom of the tower. If it is not completely saturated with respect to olefin, a suitable portion may be recycled and introduced into the tower at a point which may be substantially below the point of introduction of the fresh reagent at the top. In this way the concentration of olefin may be caused to attain the desired level in the stream passed to the desorption step. The balance of the stream withdrawn from the bottom of the absorber or, in the case where no such recycling is employed, the entire stream so withdrawn is passed to the desorption step where it is treated to effect the liberation of the dissolved olefin in concentrated form. The thus regenerated reagent solution, after cooling if necessary, is recycled to the absorber.

The conditions of absorption may vary within wide limits so long as they are such that the olefin is preferentially dissolved while the saturated hydrocarbon is not dissolved to any substantial extent. The pressure and temperature are the two principal operating conditions which will be varied to obtain the desired result. Obviously the absorption pressure and temperature are adjusted or selected with reference to one another. In general the absorption pressure may range from atmospheric to any desired superatmospheric pressure. Pressures ranging from atmospheric to 500 pounds per square inch gage will generally be used. Superatmospheric pressures are preferred because the quantity of olefin dissolved is greatly increased by elevated pressure. Thus, pressures of from 50 to 500 pounds per square inch gage are often preferred.

The preferred maximum temperature is about 30° C. The temperature may range from 30° C. downwardly to any economically feasible temperature, however, in case a water solution of methoxyethylamine is used as the absorbent solution such a low temperature as will cause water to freeze from the solution should, of course, not be used. Operating temperature should not be so low that the methoxyethylamine freezes, in case the absorbent is water free. In order to keep the reagent liquid in case it is desired to operate at low absorption temperatures, it may be necessary to use a low freezing point diluent for the reagent. Any suitable inert organic liquid which is miscible with methoxyethylamine or with a water solution of methoxyethylamine, and has a sufficiently low freezing point may be used for this purpose. Examples are methyl alcohol, ethyl alcohol, acetone, etc. The anti-freeze should be inert with respect to methoxyethylamine, the cuprous salt and the components of the hydrocarbon feed.

Desorption of the olefins is suitably conducted by increasing the temperature of the olefin-enriched solution to 40 to 100° C. or by releasing or reducing the pressure on the solution. A combination of these methods is very satisfactory.

In some cases the pressure to which the solution is reduced may be considerably below atmospheric, obtained by drawing a vacuum on the desorption zone. The regenerated solution may be reused in a continuous process.

Acetylene and hydrogen sulfide precipitate copper from cuprous salt-methoxyethylamine solutions. Removal of these compounds from raw gas mixtures prior to absorption in cuprous salt-methoxyethylamine solutions is therefore desirable.

The strength of the solution of cuprous salt in methoxyethylamine, i. e., the percentage by weight of cuprous salt based on the weight of the solution, may vary within wide limits. Ordinarily it will range from 5 per cent to saturation under the conditions of temperature employed in the absorption zone. The more nearly saturated the solution the more economical is the process because the greater is the capacity of the solution for dissolving olefins and the lower is the rate of circulation and the smaller the equipment required for a given throughput of olefin-containing feed. A saturated solution of cuprous chloride in an aqueous methoxyethylamine containing 28 per cent water at room temperature will contain over 35 per cent of cuprous chloride.

In some cases an excess of cuprous salt over the amount required to give a saturated solution may be employed with good results. The excess should be finely divided to give a smooth slurry.

The reagent generally consists of the cuprous salt, such as cuprous chloride, and an aqueous solution of methoxyethylamine. However, in unusual situations an anti-freeze liquid may be included in the reagent as explained above.

The reagent is usually in the form of a simple solution of the cuprous salt dissolved in an aqueous solution of methoxyethylamine. However, in some circumstances, we may dispose the solution on a suitable adsorptive or absorptive solid carrier such as pumice, diatomaceous earth, sawdust, etc., in which case the method of operation will be modified somewhat from that employed when the liquid reagent is used.

In some commercial installations it may be desirable to reduce the partial pressure of olefin in equilibrium with a cuprous salt aqueous methoxyethylamine solution by passing an inert gas into the system. Such a case may be illustrated as follows: olefins are concentrated from a lean olefin stream (such as refinery gases) by combining them with the reagent of the present invention. The "fat" reagent containing the absorbed olefin is then passed to a stripping or desorption zone, where an isoparaffin is introduced. The off-gas from the stripper or desorber would then constitute an olefin-isoparaffin stream suitable for use as an alkylation feed stock. The ratio of olefin to isoparaffin is readily controlled by the temperature and pressure used in the stripping operation.

Many advantages flow from the practice of the present invention. The solution is not corrosive. The solution is relatively non-volatile. No loss of ammonia is involved as has been the case when ammoniacal solutions are used. The solution exhibits excellent thermal stability. The solubility of paraffin hydrocarbons in the solution is extremely low. The solubility of the olefin hydrocarbons is extremely high. Hence, sharp olefin-paraffin separations result. Complete recovery of the dissolved olefin by desorption is readily accomplished in a simple and economical manner. The solution is long-lasting so that chemical consumption is low.

In the following examples, the cuprous salt employed was cuprous chloride. This particular cuprous salt was used because of its relatively low cost and ready availability. Other cuprous salts such as cuprous nitrate, iodide, bromide, formate, acetate, butyrate, etc., or any other cuprous salt which is soluble in methoxyethylamine may, however, be used within the scope of this invention.

Example 1

A solution was prepared by dissolving 6.00 gms. cuprous chloride in 25.0 cc. of methoxyethylamine (72 per cent in water). This represents a concentration of about 17 per cent cuprous chloride by weight. An 8.0 cc. sample of this solution at equilibrium had dissolved 63.8 cc. of ethylene. This volume of gas corresponds to an absorption coefficient of 8.0 volumes of gas per volume of solution under the conditions of the experiment (one atmosphere of pressure and 25° C.) and to about .134 mole of ethylene dissolved per mole of cuprous chloride.

Example 2

A solution was prepared by dissolving 12.0 gms. of solid cuprous chloride in 25.0 cc. of methoxyethylamine (72 per cent in water). This solution represents a concentration of about 33 per cent cuprous chloride by weight. This solution was contacted with pure ethylene at one atmosphere pressure and at 25° C. Equilibrium was reached when 9.0 cc. of the solution had absorbed 111.0 cc. of ethylene. This volume of gas corresponds to an absorption coefficient of 12.4 volumes of gas per volume of solution under the conditions of the experiment and to about .107 mole of ethylene per mole of cuprous chloride.

It will be obvious to those skilled in the art that the process of our invention can be varied within wide limits, as for example, alteration of operating pressures, temperatures, concentrations, etc., may be different than those given herein, as dictated by conditions or desired operation, and let remain within the intended spirit and scope of our invention.

Having disclosed our invention, we claim:

1. The process for separating olefins from admixture with saturated hydrocarbons which comprises contacting the hydrocarbon mixture containing the olefin and the saturated hydrocarbon with a reagent comprising a cuprous salt in methoxyethylamine.

2. The process for separating olefins from admixture with saturated hydrocarbons and recovering the olefins in concentrated form which comprises contacting the hydrocarbon mixture containing the olefin and the saturated hydrocarbon with a reagent comprising a solution of a cuprous salt in methoxyethylamine under such conditions that the olefin is preferentially dissolved in said solution while the saturated hydrocarbon remains undissolved, separating the resulting olefin-containing solution from the undissolved hydrocarbon, and desorbing the olefin from said resulting solution.

3. The process for separating olefins from admixture with saturated hydrocarbons which comprises contacting the hydrocarbon mixture containing the olefin and the saturated hydrocarbon with a reagent comprising a solution of a cuprous salt in aqueous methoxyethylamine.

4. The process for separating olefins from admixture with saturated hydrocarbons and recovering the olefins in concentrated form which comprises intimately contacting the hydrocarbon mixture containing the olefin and the saturated hydrocarbon in the gaseous state with a reagent comprising a solution of a cuprous salt in aqueous methoxyethylamine under such conditions that the olefin is preferentially dissolved in said solution while the saturated hydrocarbon remains undissolved, separating the resulting olefin containing solution from the undissolved hydrocarbon, and desorbing the olefin from said resulting solution by subjecting said solution to at least one of pressure reduction and heating.

5. The process for separating mono-olefins from admixture with paraffin hydrocarbons and recovering the mono-olefins in concentrated form which comprises intimately contacting the hydrocarbon mixture containing a mono-olefin and the saturated hydrocarbons in the gaseous state with a reagent comprising a solution of a cuprous salt selected from the group of cuprous salts consisting of cuprous chloride, nitrate, iodide, bromide, formate, acetate and butyrate in aqueous methoxyethylamine at a pressure between the limits of atmospheric and 500 pounds per square inch gauge and at a temperature between the limits of 30° C. and the freezing point of the reagent, wherein the mono-olefin is preferentially dissolved in said solution while the paraffin hydrocarbon remains undissolved, separating the resulting mono-olefin-containing solution from the undissolved paraffin hydrocarbon, desorbing the mono-olefin from said resulting solution by subjecting said solution to a temperature between the limits of 40° and 100° C. at a pressure below said contacting pressure and recovering said mono-olefin as the main product of the process.

6. The process of claim 5 wherein the cuprous salt is cuprous chloride.

7. The process for separating an aliphatic diolefin from admixture with a paraffin hydrocarbon which comprises contacting the hydrocarbon mixture containing the diolefin and the paraffin hydrocarbon with a reagent comprising a solution of a cuprous salt in methoxyethylamine.

8. The process for separating an aliphatic diolefin from admixture with a paraffin hydrocarbon which comprises contacting the hydrocarbon mixture containing the diolefin and the paraffin hydrocarbon with a reagent comprising a solution of a cuprous salt in aqueous methoxyethylamine.

9. The method for the preparation of an alkylation feed stock from a hydrocarbon stock containing a mono-olefin and a normal saturated paraffin hydrocarbon comprising contacting said hydrocarbon stock with a reagent comprising a solution of a cuprous salt in aqueous methoxyethylamine at a pressure between the limits of atmospheric and 500 pounds per square inch gage and a temperature between the limits of 30° C. and the freezing point of the reagent, separating the contacted reagent from the undissolved hydrocarbon, stripping the separated contacted reagent with an isoparaffin hydrocarbon in the gaseous state at a temperature between the limits of 40° and 100° C. at a pressure below said contacting pressure and recovering the off-gas from the stripping operation as an alkylation feed stock.

10. The process of claim 6 wherein the mono-olefin is ethylene and the concentration of the cuprous chloride in the aqueous methoxyethylamine solution is between the limits of 5 per cent and a saturated solution at the temperature in the contacting operation.

11. In the process of claim 5, wherein freezing point of the reagent is lowered by addition of methanol.

GARDNER C. RAY.
E. O. BOX, Jr.

REFERENCES CITED

The following references are of record in the file of this patent:

UNITED STATES PATENTS

| Number | Name | Date |
| --- | --- | --- |
| 2,245,719 | Robey | June 17, 1941 |
| 2,395,957 | Breuer | Mar. 5, 1946 |